Patented June 25, 1946 2,402,755

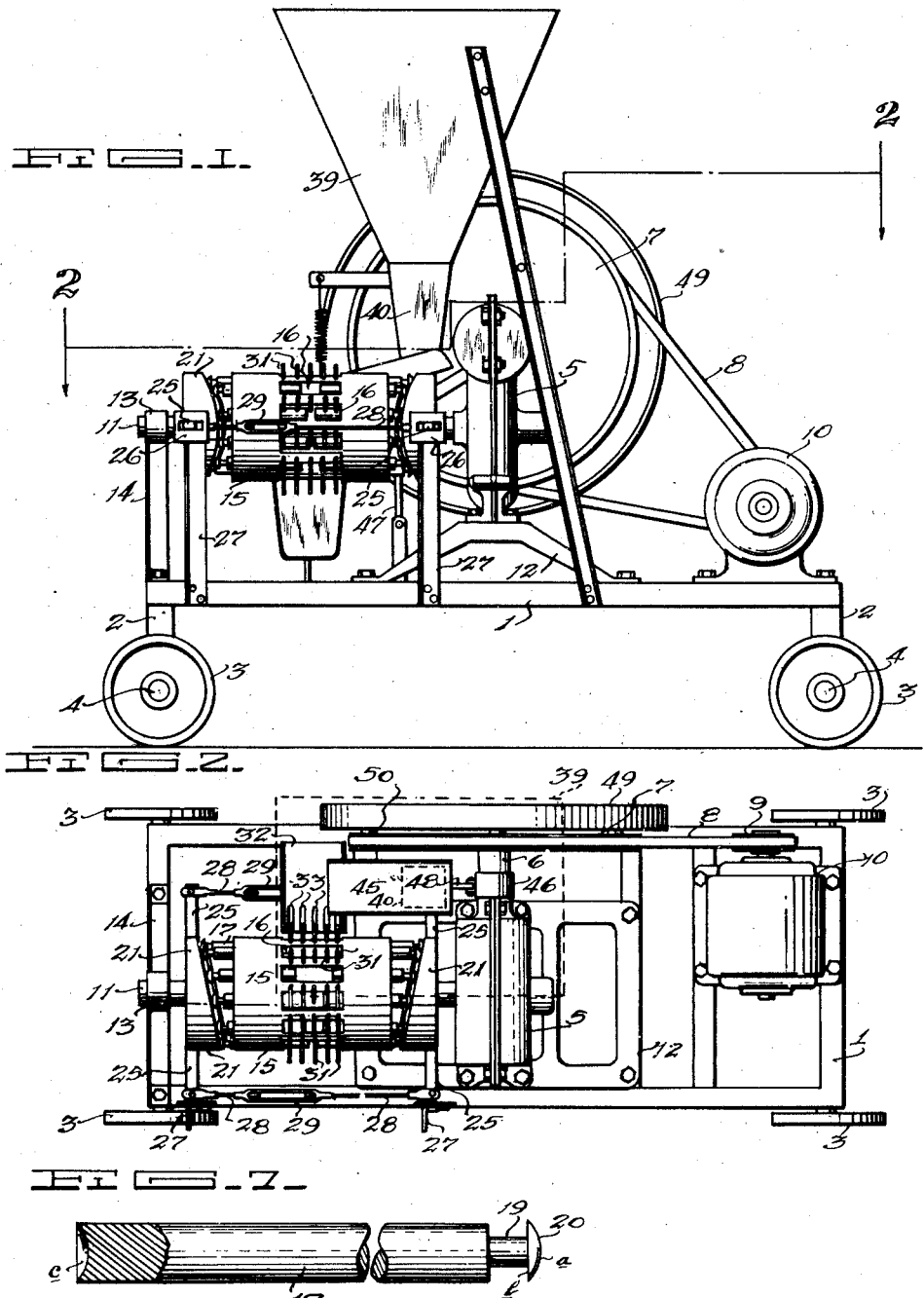

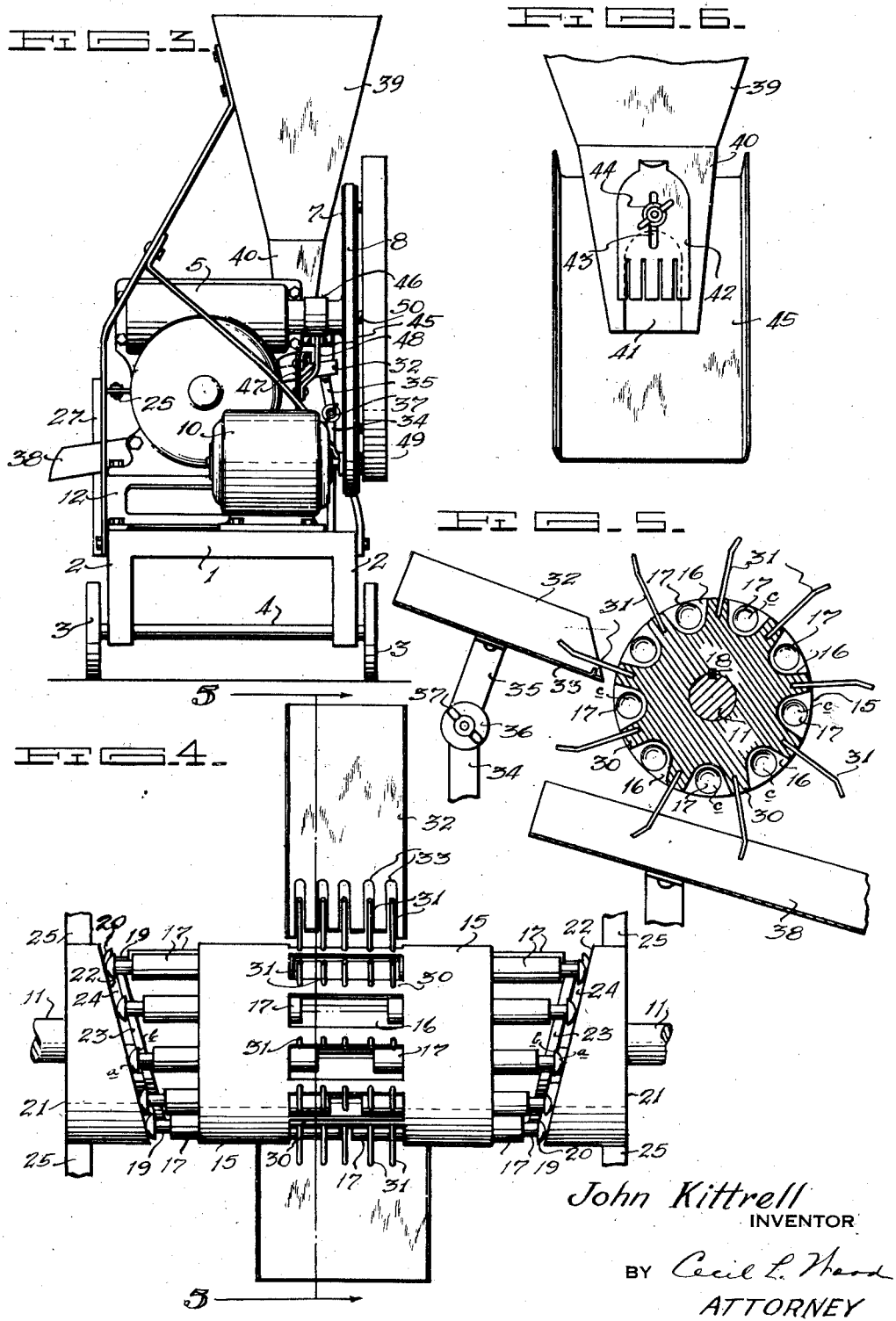

UNITED STATES PATENT OFFICE 2,402,755

NUT CRACKING MACHINE

John Kittrell, Durant, Okla.

Application October 19, 1942, Serial No. 462,635

6 Claims. (Cl. 146—12)

This invention relates to nut cracking devices and it has particular reference to apparatus for cracking pecans, walnuts, and the like, and it has for its principal object the provision of a machine capable of cracking nuts in greater quantities in the minimum amount of time and to provide a device which is simple in design and construction and economical in operation.

Another object of the invention resides in the provision of a mechanism which is positive in operation and capable of accurate adjustment adapting the apparatus to use in handling nuts of varying size and quality, bringing only the required amount of pressure upon the shell to crack the same in order that the meat of the nut may be removed without crushing or breaking the same.

Broadly, the invention seeks to comprehend the provision of a mechanism which is compact and portable yet capable of performing operations usually requiring the use of larger and more complicated and expensive conventional devices, thus conserving materials and eliminating much waste in power and requiring only a minimum of attention.

While the foregoing objects are paramount, other and lesser objects will become manifest as the description proceeds taken in connection with the appended drawings wherein:

Figure 1 is a front elevational view of the invention shown mounted on a portable frame.

Figure 2 depicts the invention in plan, taken on lines 2—2 of Figure 1, the hopper being shown in dotted lines.

Figure 3 is a right end view showing the driving mechanism and one of the adjustable chutes.

Figure 4 schematically illustrates the cracking assembly in plan, showing the arrangement of cracking plungers and illustrating the manner in which the plungers are longitudinally actuated in the device, as well as the delivery chute from which the nuts are picked up by the radially extending fingers.

Figure 5 is a transverse cross-sectional illustration, taken on lines 5—5 of Figure 4, showing the concave ends of the cracking plungers and illustrating the manner in which the pick up fingers extend radially from the cracking block, and also illustrating the adjustability of the delivery chute.

Figure 6 is a fragmentary illustration of the lower end of the hopper illustrating the adjustable closure for the outlet opening in the lower end of the hopper by which the discharge of nuts from the hopper can be controlled, and Figure 7 illustrates one of the cracking plungers, showing one end in fragmentary longitudinal section illustrating the concave cracking face of the said plunger.

The invention comprises, primarily, a frame structure 1 having paired legs 2 arranged on each end thereof, as illustrated particularly in Figure 1, and is portably supported by wheels 3 mounted on axles 4 extending through the lower ends of the legs 2. The machine is operated through the medium of a worm and gear assembly housed within the casing 5, illustrated in Figures 1, 2, and 3, the worm shaft 6 extending rearwardly of the device and having a drive wheel 7 mounted thereon which is preferably grooved for a V-belt 8 which extends around a V-pulley 9 of a motor 10 mounted on one end of the frame 1.

A shaft 11 extends longitudinally of the frame 1 and is rotated by the gear (not shown), of the worm and gear assembly within the housing 5. The assembly 5 is of the conventional type of worm and gear assemblies and is supported on the frame 1 by a super frame 12. The shaft 11 is journalled opposite the worm gear housing 5 in a bearing 13 supported by a standard 14 secured to the frame structure 1 previously described.

Mounted upon the shaft 11 and rotating therewith is a cylindrical body, which will be hereinafter referred to as the cracking block 15, and with a plurality of elongated grooves 16 extending longitudinally of the member 15 and spaced around the circumference thereof as illustrated in Figures 1, 2, and 4, and shown in cross-section in Figure 5, the said grooves 16 providing receptacles for the nuts while they are being acted upon by the cracking plungers 17 operating therein. The members 17 will be presently described.

The cracking block 15, as shown particularly in Figures 4 and 5, is so designed as to afford a liberal longitudinal surface on each end for the plungers 17 which extend through bores arranged around the outer portion of this member, as shown in Figure 5, the operative ends of the plungers 17 extending into the grooves 16 are capable of being oscillated thereinto as the member 15 rotates with the shaft 11 to which it is secured by the key 18 shown in Figure 5.

Figure 7 illustrates the cracking plunger 17 in detail and is formed with an annular groove 19 on one end which defines a head 20 having a convex outer surface $a$ and a flat inner surface $b$. The opposite end of the plunger 17 is concave at $c$ to provide a receptacle for the ends of the nut operated upon the device and afford a cracking surface in a manner hereinafter described.

Arranged adjacent to each end of the rotating member 15 are eccentrics 21 which are journalled upon the shaft 11 but are retained stationary and do not rotate therewith. These members, while cylindrical in form and substantially the same in diameter as the cracking block member 15, have diagonal inner faces 22, each directed toward the cracking block 15, in the manner illustrated in Figure 4, and each is provided with integral flanges 23 which follow the diagonal inner faces 22 of the members 21 and are adapted to be received by the grooves 19 in the ends of the plungers 17 previously described, the heads 20 thereof extending into the grooves 24 formed around the flanges 23 and between these members and the inner surfaces 22 of the members 21.

Each of the eccentric members 21 is retained by connecting bars 25 extending from each side thereof, as illustrated in Figures 2 and 4, and projects through slotted plates 26 supported on the upper ends of standards 27. The bars 25 are connected longitudinally of the device by rods 28, each having turn buckles 29 thereon by which the members 21 can be adjustably positioned with respect to the cracking block 15. These members can be spaced from the member 15 to regulate the pressure of the plungers 17 upon the nuts deposited therebetween and compensate for varying sized nuts processed through the apparatus. It is to be understood that any type of conventional sorting or grading apparatus may be employed for previously grading the nuts as to size before introducing the same to the invention herein described.

Arranged longitudinally along the ribs 30 which provide divisions between the grooves 16 are multiples of radially extending fingers 31, illustrated particularly in Figure 5, which serve to pick up the nut from the delivery chute 32 which latter is provided with a series of slots 33 in its lower end, as shown in Figure 4, through which the fingers 31 pass during the rotation of the cracking block 15. The chute 32 is adjustable with respect to the cracking assembly being supported by a standard 34 to which is connected through a rigid coupling 35 by a pivotal adjustment 36 comprising a bolt and wing nut assembly 37. By this arrangement different sizes of nuts, in lots, can be properly fed to the grooves 16. It is important that the nuts be "rolled" into the grooves 16 rather than "tumbled" thereinto so that the plungers 17 will contact the nut and bear on each end thereof to crack the shell and avoid crushing the meat.

As the member 15 rotates the plungers 17 are operated by the eccentric members 21 so that the cracking surfaces c of the plungers 17 are widest apart as the nut is delivered into the grooves 16 from the delivery chute 32 and are closest at a point opposite the latter where the cracking operation is completed. As the member 15 continues to rotate the plungers 17 separate near the bottom of the assembly permitting the nut to be deposited to a chute 38 which delivers them to a container (not shown).

The nuts are initially delivered into a hopper 39, shown in Figures 1, 3, and 6, having a delivery spout 40 at the lower end thereof and which has an opening 41 on one side. The opening 41 is partially covered by a closure 42 capable of vertical adjustment through the medium of a slot 43 and a bolt and wing nut assembly 44 providing for the discharge of nuts therethrough in proportion to the size of the nut and the speed of the machine. The nuts are discharged from the hopper into a chute 45 which delivers the same at right angles, to the chute 32, previously described and shown in Figure 5.

The chute 45 is preferably agitated in order to insure a continuous flow of the nuts to the chute 32 and this is accomplished through an eccentric or cam operating within a collar 46 surrounding the shaft 6 of the worm to which the drive-wheel 7 is connected and is illustrated in Figure 3. The collar 46 is pivotally connected to the standard 47 supporting the chute 45 through an arm 48 and thus an arrangement is provided whereby, as the shaft 6 is rotated and the cam (not shown) thereon is rotated within the collar 46, the latter oscillates the arm 48 moving the standard 47, which is pivotally connected at its base to the frame 1, to agitate or shake the chute 45.

In order to provide momentum for the machine a flywheel 49 is provided and is secured by suitable connections 50 to the grooved drive-wheel 7, as shown in Figures 1, 2, and 3.

Although the invention has been described with great particularity, it is not intended that the same be limited to the structure herein shown and described and that any obvious changes and modifications resorted to which may be considered as falling within the spirit of the invention may also be considered as falling within the scope of the appended claims.

What is claimed is:

1. In a nut cracking device having a frame and a driving mechanism, a shaft supported by the said frame, a cylindrically formed cracking block supported for rotation on the said frame by the said shaft, a plurality of spaced grooves arranged longitudinally of and around the circumferential face of the said block providing receptacles for nuts, a plurality of paired cracking plungers operating in the said block in each end of each of the said grooves and adapted to move toward each other therein, means comprising opposingly arranged stationary eccentric members slidably adjustable on the said shaft and having interlocking operative connection with the said plungers effecting the operation of the said plungers and means associated with the said eccentric members for providing adjustability thereof with respect to the said cracking block.

2. In a portable nut cracking machine having a supporting frame and a driven shaft, a cylindrical cracking block rotatably mounted on the said shaft, a plurality of slots formed in the outer face of the said block and arranged longitudinally thereof providing receptacles for nuts, a pair of coacting plungers operatively extending into the ends of the said slots adapted to engage nuts therebetween, each of the said plungers having rounded heads on their opposite ends and circumferential grooves adjacent the said heads, and cams arranged coaxially of the said cracking block having circular flanges engaging the said grooves adjacent the said plunger heads cooperating with the said cams in operating the said plungers toward and away from the nuts in the said receptacles.

3. In a nut cracking machine having a frame and a driven shaft, a cylindrical cracking block rotatable with the said shaft and having nut receptacles arranged around its face, paired cracking elements having their operative ends extending into opposite ends of each of the said receptacles, the outer ends of each of the said cracking elements formed with rounded heads and circumferential grooves adjacent the said heads and stationary cams arranged on each side of the said cracking block and having oblique surfaces engageable with the said rounded heads and flanges engageable with the said circumferential grooves for effecting synchronized oscillation of each pair of the said cracking elements.

4. In a nut cracking device having a supporting frame and driving mechanism, a shaft supported by the said frame, a nut cracking block mounted on the said shaft and formed with an arrangement of circumferentially spaced nut receptacles, a plurality of paired cracking elements arranged for synchronized movement longitudinally in each of the said receptacles, stationary adjustable cams arranged on the said shaft and having means on their operative faces for engaging the heads of the said plungers and effecting the positive operation thereof in both directions and means for adjusting the said cams relative to the said cracking block.

5. In a nut cracking device, the combination with a frame and a driving mechanism, a shaft and a rotating cracking block mounted thereon supported by the said frame, a plurality of longitudinally arranged spaced grooves providing receptacles in the peripheral face of the said block, a plurality of pairs of cracking plungers slidably arranged in each end of the said block and operating opposingly in each of the said grooves, opposingly arranged stationary eccentric members having oblique operative faces and adjustably supported on the said shaft at each side of the said block and having means on their said faces for engaging the outer ends of the said plungers for effecting the reciprocal movement thereof and means for slidably adjusting the said eccentric members along the said shaft relative to the said cracking block.

6. In a nut cracking device having a supporting frame, a shaft and a driving mechanism, a rotating cracking block supported on the said shaft, a plurality of longitudinally arranged spaced receptacles around the face of the said cracking block, a plurality of paired cracking plungers adapted to be operated in each of the said receptacles to engage a nut deposited therein, means comprising eccentric stationary members slidably and adjustably supported on each side of the said cracking block and having oblique surfaces and means thereon engageable with the outer ends of the said plungers effecting the movement of the said plungers in both directions as the said block is rotated and means connected to each of the said eccentric members providing for the slidable adjustment thereof with respect to the said block.

JOHN KITTRELL.